United States Patent [19]

Krull

[11] Patent Number: 5,490,930
[45] Date of Patent: Feb. 13, 1996

[54] FILTER

[75] Inventor: Timothy L. Krull, Kearney, Nebr.

[73] Assignee: Baldwin Filters, Inc., Kearney, Nebr.

[21] Appl. No.: 314,516

[22] Filed: Sep. 27, 1994

[51] Int. Cl.$^6$ ................................................. B01D 35/30
[52] U.S. Cl. ........................ 210/443; 210/450; 210/455; 210/DIG. 17; 29/163.8; 29/505; 29/509; 29/513; 29/521
[58] Field of Search ........................ 210/232, 440–444, 210/450, 454, 455, DIG. 17; 29/163.8, 505, 509, 513, 521

[56] References Cited

U.S. PATENT DOCUMENTS 3,232,437  2/1966  Hultgren ................................. 210/440

Primary Examiner—Matthew O. Savage
Attorney, Agent, or Firm—Leydig, Voit & Mayer

[57] ABSTRACT

A spin-on filter includes a baseplate secured to an end cover and further includes a filter element disposed in a canister having an open end. The end cover is secured to the open end of the canister by seaming a flange formed at the edge of the end cover with a flange formed at the end of the canister. An end cap which is secured to the filter element is trapped between the baseplate and the seamed flanges, thereby securing the filter element in the canister and avoiding the need of a helical spring for urging the filter element toward the baseplate.

15 Claims, 3 Drawing Sheets

FILTER

BACKGROUND OF THE INVENTION

This invention relates generally to a filter for liquids such as lubricating oil, hydraulic fluid and the like. More specifically, the invention relates to a so-called spin-on filter adapted to thread onto a mounting adaptor of, for example, a hydraulic system or a lubrication system.

A spin-on filter is designed for a specified service life. The filter is then discarded and replaced with a new filter. Typically, more than one manufacturer produces filters which are interchangeable. As a disposable or throw-away type of item, the decision to purchase one brand of filter over a different brand is often based substantially on the price of the filter.

A spin-on filter typically includes a filter element and a seal which are located in a sheet metal canister having an open end. The seal operates to separate the filtered oil from the contaminated oil inside the canister. A baseplate assembly which is adapted to screw onto the mounting adaptor is secured to the open end of the canister by seaming a flange on the baseplate assembly with a flange on the canister. In addition, a helical compression spring normally is located inside the canister of prior filters, between the closed end of the canister and the end of the filter element to hold the filter element in place and, in some instances, to preload the seal.

The presence of the compression spring in the prior filter complicates the assembly of the filter. After the internal components of the filter are assembled into the canister and before the baseplate assembly and the canister have been seamed together, the spring is in a relaxed state and causes the flange of the baseplate assembly to be raised up and substantially separated from the flange on the canister. To insure proper interlocking of the flanges, the spring must be held in compression during the seaming operation. The purpose of the spring is to maintain the filter element and the seal in alignment with the baseplate assembly and in a secured position in the canister.

SUMMARY OF THE INVENTION

The general aim of the present invention is to provide a lower cost filter by reducing the number of the components used in the filter.

Another general aim is to provide a filter which may be more easily assembled by eliminating a step in the assembly process of the filter.

A more detailed objective of the present invention is to achieve the foregoing by providing for a filter element which is capable of being secured in the canister as an incident to a seaming operation which secures the flanges of a baseplate assembly and the canister together.

A still more detailed objective is to provide a filter element having an end cap with an end portion which is deformed during the seaming step and which is trapped between the baseplate and the seamed flanges, thereby eliminating the need for a helical compression spring to maintain the filter element in a secured position in the canister.

The invention also resides in the relatively simple modification of a second end cap to compress a seal located between the filter element and a baseplate, thereby eliminating the need to have a helical compression spring for preloading the seal.

These and other objectives and advantages of the present invention will become more apparent from the following detailed description when taken in conjunction with the accompanying drawings.

Figure 1:
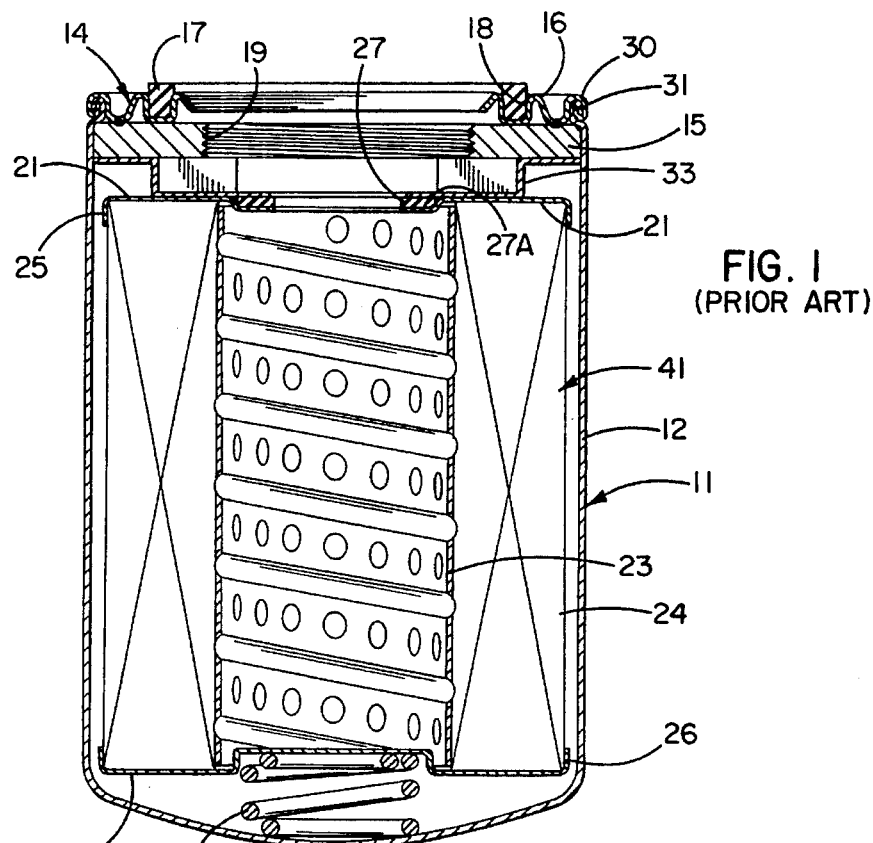
FIG. 1 is a cross-sectional view of a typical prior filter.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Figure 2:
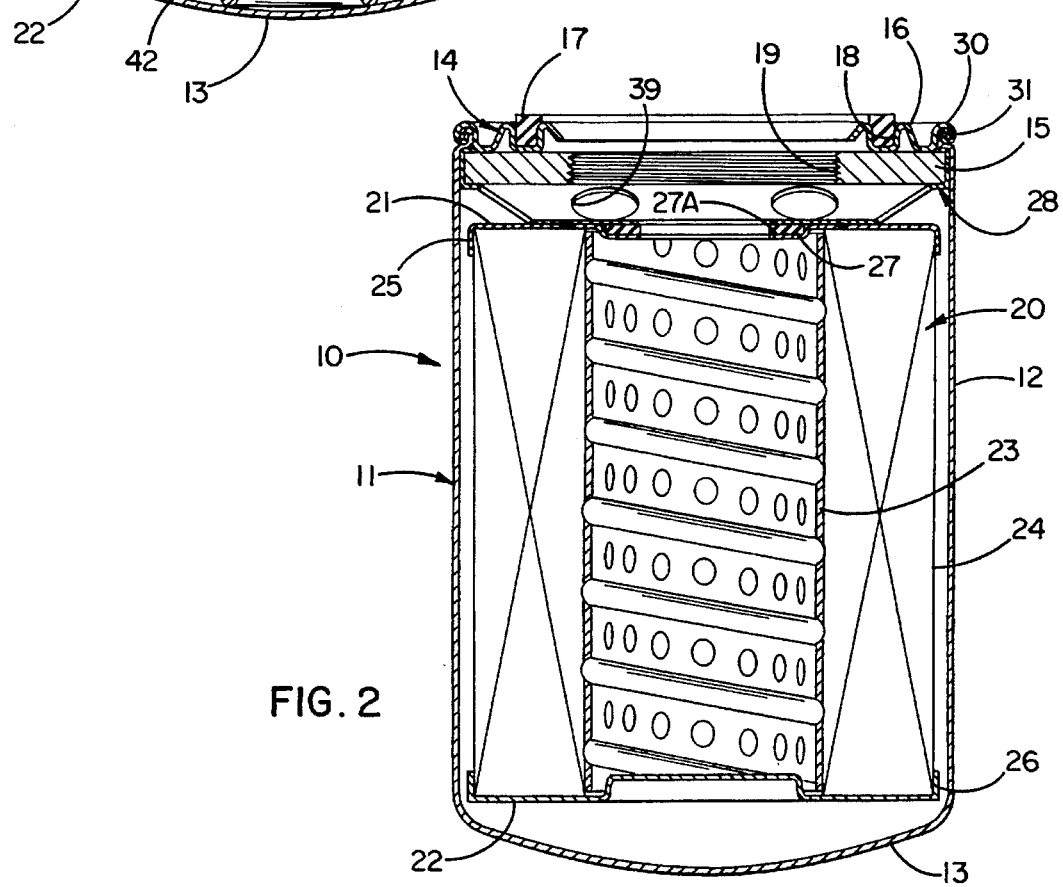
FIG. 2 is a cross-sectional view of a new and improved filter incorporating the unique features of the present invention.

For purposes of illustration, the present invention has been shown in the drawings as incorporated in a spin-on filter 10 (FIG. 2) of the type commonly used for filtering hydraulic fluid or lubricating oil. The filter 10 includes a housing or canister 11 having a generally cylindrical sidewall 12 and an end wall 13 which closes one end of the canister. The canister is preferably drawn from steel sheet metal. Secured in and generally closing off the open end of the canister is a baseplate assembly 14. The baseplate assembly is adapted for connection with a mounting adaptor (not shown) of the hydraulic or lubrication system. The adaptor receives contaminated oil from and returns filtered oil to the system.

The baseplate assembly 14 includes a steel baseplate 15 and a steel sheet metal seaming lid or end cover 16. The baseplate is welded to the end cover before the baseplate assembly is installed into the open end of the canister 11. A resilient seal ring 17 is located in an annular groove 18 formed in the end cover. The seal ring 17 seals the baseplate assembly to the mounting adaptor in order to prevent leakage of oil from the lubrication system to the outside environment. The baseplate is formed with a threaded opening 19 which is adapted to thread onto the mounting adaptor.

A tubular filter element 20 is located in the canister 11. The filter element consists of two sheet metal end caps 21, 22, a perforated inner liner 23, and a suitable filter media 24 for filtering the contaminants from the oil. The end caps 21, 22 are secured to the ends of the liner and are formed with circumferential flanges 25, 26, respectively, to captivate the filter media around the liner. The end cap 21 is formed with a central opening while the end cap 22 is closed.

A resilient seal 27 is located in a recess 27A formed in the end cap 21. The seal 27 is aligned with the threaded opening 19 and is trapped in the recess by a spacer 28. The seal 27 cooperates with the mounting adaptor to separate the filtered oil from the contaminated oil in the canister 11.

In this instance, the mounting adaptor includes an externally threaded member adapted to engage the threaded opening 19 and a hollow tubular member or post that is located in the center of the threaded member. The outside periphery of the post extends through the seal 27 and seals against the internal diameter of the seal 27. The contaminated oil enters the filter through a space between the post and the externally threaded member of the mounting adaptor and flows through openings 39 formed in the spacer 28 to the outer periphery of the filter media 24. Contaminant is removed from the oil as the oil flows inwardly through the filter media and through the liner 23. The filtered oil then exits the filter through the center passage of the hollow tubular member and returns to the system.

The end cover 16 and the canister 11 are secured together at the open end of the canister. The outer edge of the end cover is initially formed as a radially extending flange 30 (FIG. 3) and the free end of the canister is formed with a radially extending flange 31. Formed at the inner diameter of the flange 30 on the end cover is an axially extending portion 32 which maintains the baseplate 15 in axially spaced relation with the flange 30. As the baseplate 15 is inserted into the open end of the canister, the flange 30 of the end cover is located in abutting relation with the flange 31 of the canister. The flanges 30, 31 are then circumferentially seamed together.

Figure 4:
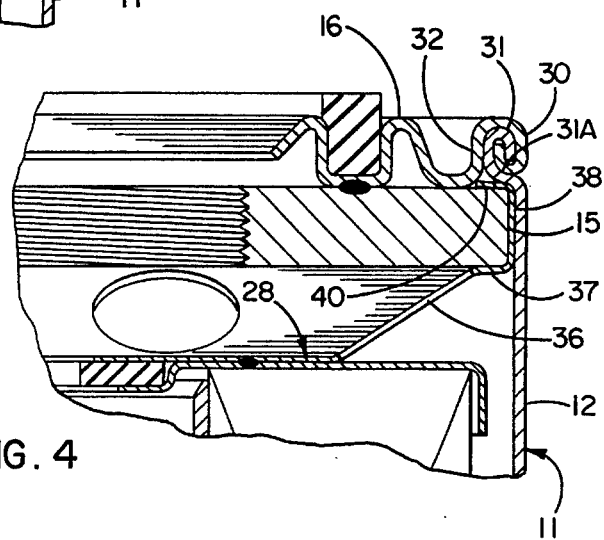
FIG. 4 is a view similar to FIG. 3 but shows the parts after the seaming operation.

As a result of the seaming process, the flanges 30 and 31 and a portion 31A of the canister sidewall 12 which is adjacent the flange 31 are deformed so that the outer edge of the end cover 16 and the free end of the sidewall circumferentially interlock (FIG. 4). Specifically, the end of the flange 31 extends downwardly toward the closed end of the canister 11 and the end of the flange 30 wraps around the end of the flange 31 and extends longitudinally away from the closed end of the canister and radially inwardly of the end of the flange 31. During the seaming operation, the portion 31A of the sidewall is deformed radially inwardly so that it is located inwardly of the seamed flanges and adjacent the baseplate 15.

A prior filter (FIG. 1) includes a helical compression spring 42 in addition to the above-described components. The compression spring is located between the closed end 13 of the canister 11 and the end cap 22 and secures a spacer 33 and a filter element 41 in position in the canister by continuously urging the filter element and the spacer toward the baseplate 15. In the prior filter, the spacer 33 is not secured to the end cap of the filter element 41.

The presence of the compression spring 42 in the prior filter complicates the assembly of the filter. After the spring, the filter element 41, the seal 27 and the spacer 33 are assembled into the canister 11 and before the baseplate assembly 14 and the canister have been seamed together, the spring is in a relaxed state and causes the flange 30 of the end cover 16 to be raised up and substantially separated from the flange 31 of the canister. To insure proper interlocking of the flanges 30 and 31, the spring must be held in compression during the seaming operation. The purpose of the spring is to maintain the filter element, the spacer, and the seal in alignment with the baseplate assembly and in a secured position in the canister and, in some instances, to axially compress the seal.

In accordance with one aspect of the present invention, the filter element 20 is manufactured as a subassembly which includes the seal 27 and the spacer 28. Moreover, the spacer is used to secure the subassembly within the canister 11. As will become apparent subsequently, this arrangement enables the filter element to be secured in the canister and enables the seal 27 to be axially and radially secured without the need for a helical compression spring.

More specifically, the center portion 35 (FIG. 3) of the spacer 28 is resistance welded at 35A to the upper end cap 21 after the seal 27 has been located in the recess 27A in the end cap. The recess is dimensioned and configured so that the seal is compressed between the spacer and the end cap after the end cap and spacer have been welded together. Trapping the seal between the welded end cap and spacer insures that the seal is concentric with the center opening of the end cap 21 and prevents the seal from slipping out of the recess during subsequent assembly steps of the filter 10.

Further in accordance with the present invention, the filter element 20 includes means for interlocking between the baseplate 15 and an inwardly deformed portion of the canister 11 as an incident to the seaming operation between the flanges 30 and 31. In one embodiment of the present invention, the spacer 28 (FIG. 3) is uniquely configured to extend between the baseplate and the sidewall 12 and to additionally interlock around the baseplate. As a result, the filter element 20 is positioned and secured in the canister 11 without the need for a compression spring. In addition, radial alignment of the seal 27 with respect to the threaded opening 19 is improved over prior filters.

More specifically, the sheet metal spacer 28 (FIG. 3) is of circular cross-section and is formed with an angled portion 36, a radially extending shoulder 37 and an axially extending portion 38. Additionally, the spacer 28 is formed from sheet metal having a thickness less than the thickness of the sidewall 12 so that the end of the spacer does not cut the wall of the canister 11 during the seaming operation (discussed below).

The angled portion 36 of the spacer 28 extends generally outwardly from the outer diameter of the center portion 35 of the spacer and generally toward the open end of the canister 11. The shoulder 37 extends radially outwardly from the end of the angled portion 36. The portion 38 is formed as a ring which extends upwardly from the outer diameter of the shoulder 37 and extends circumferentially between the outer diameter of the baseplate and the inside surface of the sidewall 12.

The baseplate 15, the ring portion 38 and the inside surface of the sidewall 12 are dimensioned so that the alignment and concentricity between the threaded opening 19 and the seal 27 is maintained within a predetermined limit. Specifically, the inner diameter of the ring portion 38 is just slightly greater than the outside diameter of the baseplate 15 while the outer diameter of the ring portion 38 is just slightly less than the inside diameter of the sidewall 12. The shoulder 37 is formed to hold the baseplate parallel with the end cap 21 and the recess 27A. This relative arrangement substantially improves the alignment between the seal and the mounting adaptor.

When the filter element subassembly 20 and the baseplate assembly 14 are assembled into the canister 11 (FIG. 3), the end portion 40 of the ring 38 extends beyond the baseplate and the flanges 30 and 31 are in abutting relation. The seaming of the flanges 30, 31 then proceeds as described above. However, in carrying out the invention, the end portion 40 of the ring 38 is bent over until it abuts the baseplate 15 as the portion 31A is deformed radially inwardly. After the seaming operation has been completed (FIG. 4), the end portion 40 of the spacer is axially trapped between the baseplate 15 and the seamed flanges 30, 31. As a result, the position of the filter element 20 including the seal 27 is radially fixed in the canister 11 and, at the same time, the filter element is held securely within the canister.

A method of manufacturing the filter includes the steps of:

a. providing (i) a canister 11 (see FIG.3) having an open end and a closed end and having a sidewall 12 extending longitudinally between said open end and said closed end, the sidewall having a radially outwardly extending flange 31 at the open end, (ii) an end cover 16 having a radially outwardly extending outer edge portion, (iii) a baseplate 15 having an outer periphery sized to slidably fit into said sidewall at said open end, (iv) a filter element 20, and (v) a member or spacer 28 having a generally longitudinally extending section 38 with an end portion 40, the longitudinally extending section being sized to slidably fit around the outer periphery of said baseplate and to slidably fit within the sidewall;

b. securing the end cover to the baseplate;

c. securing the member with respect to said filter element so that the longitudinally extending section projects generally away from said filter element;

d. locating the filter element and the member in the canister so that the longitudinally extending section of the member is adjacent and inside of the sidewall and the end portion faces generally toward the open end of the canister;

e. locating the baseplate and the end cover in the canister so that the outer edge portion of the end cover is adjacent the flange and so that the baseplate is located in the open end of the canister between the end cover and the member with the outer periphery being interiorly of said longitudinally extending section;

f. radially inwardly deforming a portion of the sidewall so that the inwardly deformed portion is adjacent the end portion of the longitudinally extending section and the base plate is located between the inwardly deformed portion and the closed end of said canister;

g. interlocking the outer edge portion of the end cover and the flange so that the end cover and the baseplate are secured to the canister; and h. radially inwardly deforming the end portion of the longitudinally extending section so that the deformed end portion engages and is trapped between the baseplate and the inwardly deformed portion of the sidewall thereby securing the member and the filter to the canister.

Figures 5, 8:
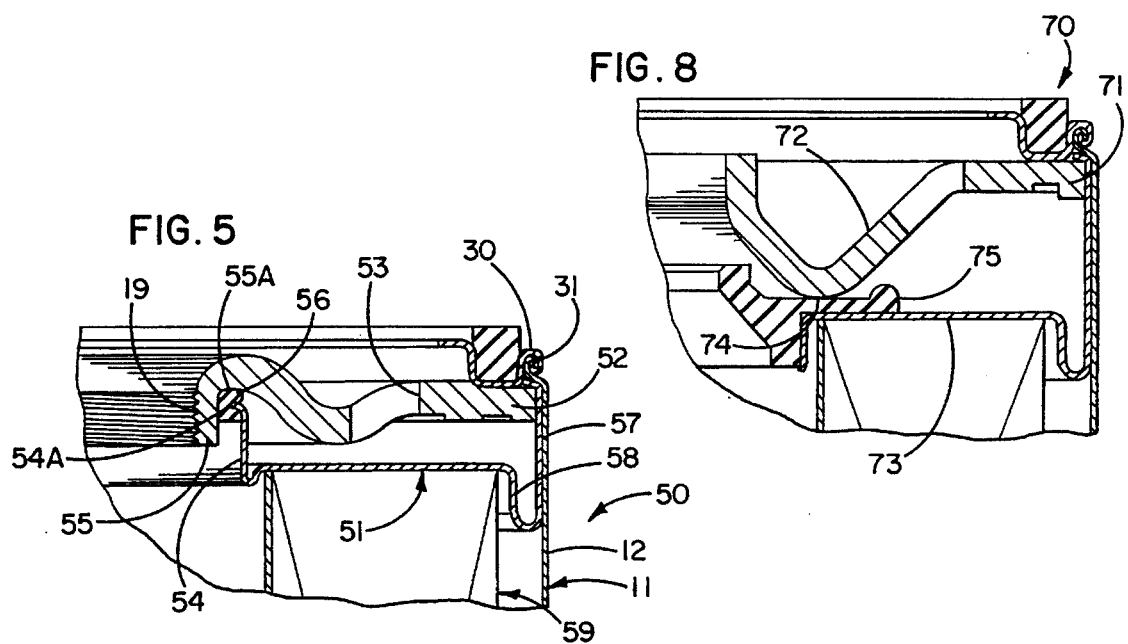
FIG. 5 is a view similar to FIG. 4 but shows an alternate seal and end cap arrangement.
FIG. 8 is a view similar to FIG. 4 but shows an alternate seal and end cap arrangement for the filter of FIG. 6.

In an alternate embodiment, the filter 50 (FIG. 5) is constructed by eliminating the spacer 28. Inlet openings 53 for receiving contaminated oil from the mounting adaptor of the lubrication system are formed in the baseplate 52 and are located radially outwardly of the threaded opening 19.

In carrying out the invention, a ring 54 is formed integrally with the inner periphery of the end cap 51 and extends generally axially toward the baseplate 52. A radially inwardly facing seal surface 54A is defined at the end of the ring 54. The opening 19 is formed in an axially inwardly projecting ring portion 55 of the baseplate 52. The ring 55 projects past the end of the ring 54 so that an outer circumferential sealing surface 55A is defined on the ring 55 and is spaced inwardly of the sealing surface 54A. The sealing surfaces 54A, 55A are dimensioned so that a seal 56 engages the sealing surfaces and prevents fluid communication between the filtered oil and the contaminated oil inside the canister without the aid of a compression spring.

Figure 3:
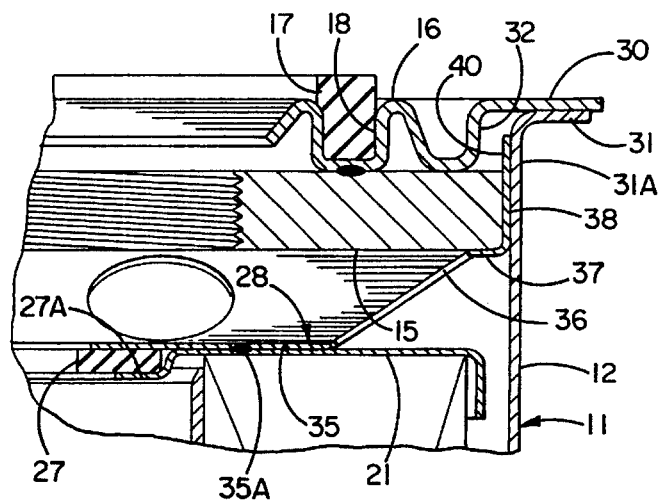
FIG. 3 is an enlarged fragmentary view of certain components of FIG. 2. before the parts are secured together by a seaming operation.
Figure 7:
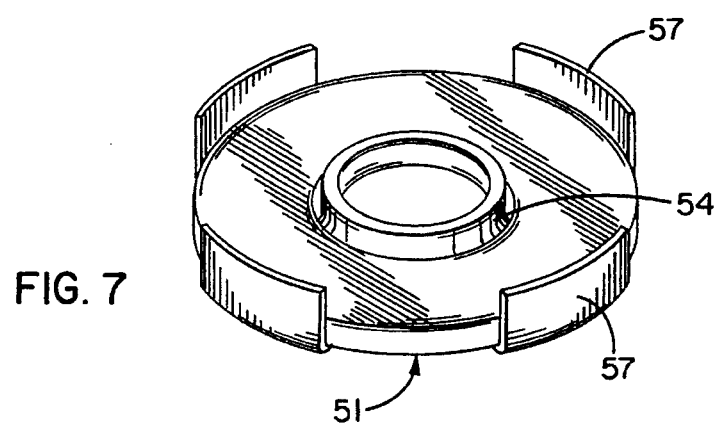
FIG. 7 is a perspective view of the end cap used in the embodiment shown in FIG. 5.

Tabs 57 (FIG. 7) are formed integrally with and spaced circumferentially around the outer flange 58 of the end cap 51. The tabs 57 project axially toward the open end of the canister 11 between the baseplate 52 and the sidewall 12 so that ends of the tabs extend beyond the baseplate. The tabs 57 are each formed having a radius of curvature so that, together, the tabs 57 define a discontinuous ring which is dimensioned and configured substantially similarly to the continuous ring 38 (FIG. 3). The contaminated oil passes through the spaces defined between adjacent tabs 57 as the oil flows from the openings 53 toward the outer periphery of the filter element 59. When the flanges 30, 31 are seamed together, the ends of the tabs 57 are turned radially inwardly by the portion 31A and are trapped between the baseplate 52 and the seamed flanges, thereby securing the filter element 59 in the canister 11.

Figure 6:
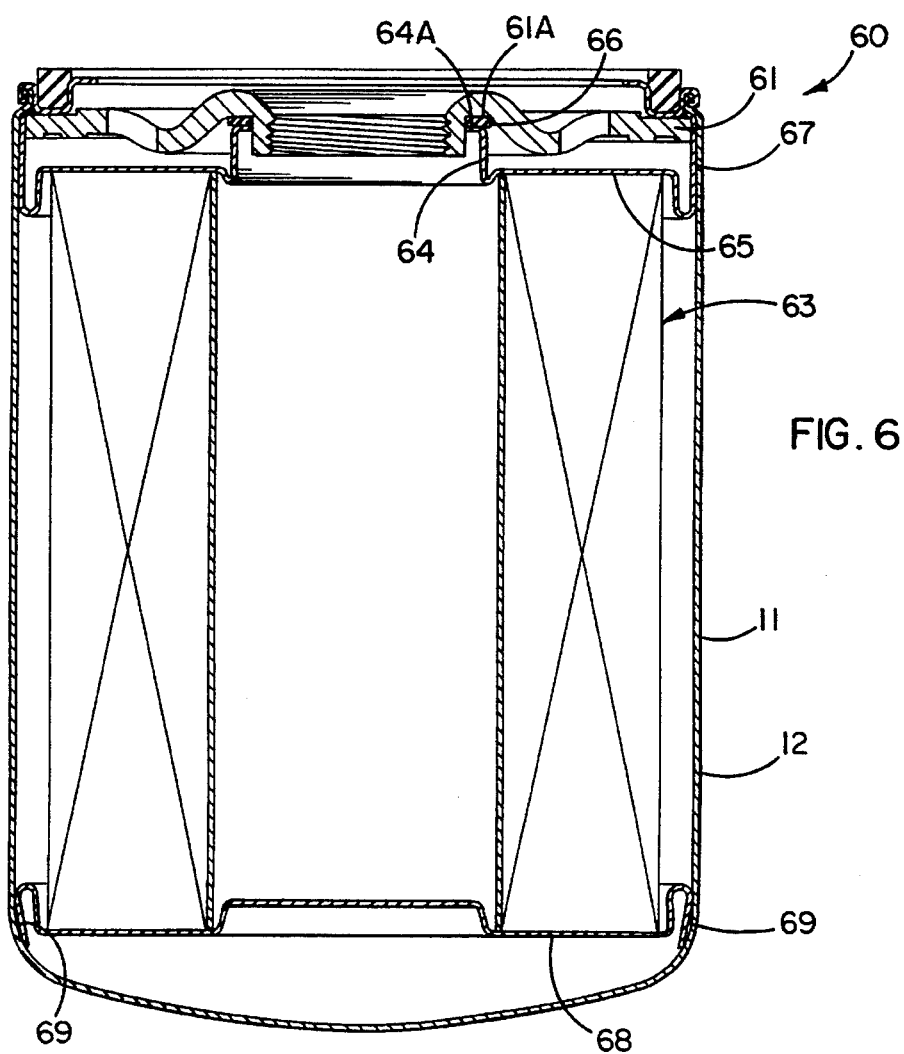
FIG. 6 is a cross-sectional view of another embodiment of the filter.

In a second alternate embodiment, the filter 60 (FIG. 6) is constructed with a baseplate 61 having an annular sealing surface 61A facing the filter element 63. A ring 64 is formed integrally with the inner periphery of the end cap 65 and projects axially toward the annular sealing surface 61A. An annular sealing surface 64A is formed on the end of the ring 64 and faces the sealing surface 61A. A seal 66 is located between the baseplate and the end of the ring 64 and engages the sealing surfaces 61A, 64A. Tabs 67 are formed similar to the tabs 57 so that the ends of the tabs 67 extend inwardly and are trapped between the baseplate and the inwardly deformed portion of the seamed flanges 30 and 31, thereby securing the filter element in the canister.

The end cap 68 is constructed with integrally formed resilient tabs 69 which extend axially from the outer flange of the end cap toward the closed end 13 of the canister 11. The tabs 69, also formed similar to the tabs 57, engage the sidewall 12 of the canister 11 when the filter element 63 is inserted into the canister. As a result, the flanges 30 and 31 (see FIG. 3) are slightly separated. When the end cover and the canister are pressed together during the seaming operation, the tabs 69 resiliently deflect causing the seal 66 to be axially compressed between the sealing surfaces 61A, 64A without the need for a helical compression spring.

Alternately, the filter 70 (FIG. 8) includes a baseplate 71 formed with a ring 72 which projects generally toward the end cap 73. The ring 72 is formed with an annular sealing surface 74 which is concentric with the inner periphery of the end cap 73. The seal ring 75 is located between and engages the annular sealing surface 74 and the inner periphery of the end cap 73. The filter 70 further includes a closed end cap and resilient tabs similar to the end cap 68 and the tabs 69 so that, when the flanges 30, 31 are seamed together, the tabs cause the seal 75 to be axially compressed between the annular sealing surface 74 and the inner periphery of the end cap 73.

From the foregoing, it will be apparent that the present invention brings to the art a new and improved filter in which the filter element is securely positioned in the canister by virtue of means interlocking between the baseplate and an inwardly deformed portion of the canister as an incident to seaming the flanges of the canister and the end cover together. Accordingly, the helical compression spring of prior filters has been eliminated by the present invention.

I claim:

1. A filter comprising a canister having an open end and a closed end and having a sidewall extending longitudinally between said open end and said closed end, said sidewall having an end portion adjacent said open end and having a radially inwardly deformed portion located near said open end, an end cover having an outer edge portion interlocking with said end portion of said sidewall, a baseplate secured to said end cover and located in said open end of said canister adjacent said inwardly deformed portion and between said inwardly deformed portion and said closed end, a tubular filter element located in said canister and having first and second ends, and an end cap secured to said first end of said filter element, said end cap having a first portion extending longitudinally between said baseplate and said sidewall and having a second portion extending radially inwardly from said first portion wherein said second portion engages and is trapped between said baseplate and said inwardly deformed portion of said sidewall.

2. A filter as recited in claim 1 further comprising a plurality of tabs, said tabs being integrally formed with said end cap and having said first and second portions.

3. A filter as recited in claim 1 wherein said end portion of said sidewall extends longitudinally toward said closed end of said canister and wherein said edge portion of said end cover extends longitudinally away from said closed end of said canister.

4. A filter as recited in claim 3 wherein said end portion of said sidewall is located radially outwardly of said inwardly deformed portion and wherein said outer edge portion of said end cover is located radially inwardly of said end portion.

5. A filter as recited in claim 1 further comprising a seal made of resiliently yieldable material located between said end cap and said baseplate.

6. A filter as recited in claim 5 wherein said baseplate comprises a first opening adapted to introduce a supply of contaminated fluid into said canister and a second opening adapted to deliver a supply of filtered fluid from said canister, and wherein said seal prevents fluid communication between said supply of contaminated fluid and said supply of said filtered fluid interiorly of said canister.

7. A filter as recited in claim 6 wherein said baseplate further comprises a longitudinally extending surface and wherein said seal engages said longitudinally extending surface.

8. A filter as recited in claim 5 further comprising a second end cap secured to said second end of said filter element and having resilient portions engaging said canister interiorly of said sidewall to cause said seal to be resiliently compressed.

9. A filter comprising a canister having an open end, a closed end, and a longitudinally extending sidewall, said sidewall having an end portion adjacent said open end and having a radially inwardly deformed portion located near said open end, an end cover having an outer edge portion interlocking with said end portion of said sidewall, a baseplate secured to said end cover and located in said open end of said canister adjacent said inwardly deformed portion and between said inwardly deformed portion and said closed end, a tubular filter element located in said canister, an end cap secured to said filter element, and a spacer secured to said end cap said spacer having a first portion extending longitudinally between said baseplate and said sidewall and having a second portion extending radially inwardly from said first portion wherein said second portion engages and is trapped between said inwardly deformed portion of said sidewall and said baseplate.

10. A filter as recited in claim 9 further comprising a seal made of resiliently yieldable material located between said spacer and said end cap.

11. A filter comprising a canister having open and closed ends and having a sidewall extending longitudinally between said ends, said sidewall having an end portion adjacent said open end and having a radially inwardly deformed portion located near said open end, an end cover having an outer edge portion interlocked with said end portion of said sidewall, a baseplate secured to said end cover and located in said open end of said canister adjacent said inwardly deformed portion, a tubular filter element located in said canister and having first and second ends disposed between said inwardly deformed portion and said closed end, and means joined to said first end of said filter element, said means having a first portion extending longitudinally between said baseplate and said sidewall and having a second portion extending radially inwardly from said first portion and sandwiched between said baseplate and said inwardly deformed portion to attach said filter element to said canister.

12. A filter as recited in claim 11 in which said means include an end cap attached to said first end of said filter element, said first and second portions being integral with one another and being integral with said end cap.

13. A filter as recited in claim 11 in which said means include an end cap attached to said first end of said filter element and further include a spacer formed separately of and secured to said end cap, said spacer having a center portion located between said end cap and said baseplate, said first and second portions being integral with one another and being integral with said center portion of said spacer.

14. A filter as recited in claim 11 in which said means include a plurality of tabs having said first and second portions.

15. A method of manufacturing a filter, said method comprising the steps of:

a. providing (i) a canister having an open end and a closed end and having a sidewall extending longitudinally between said open end and said closed end, said sidewall having a radially outwardly extending flange at said open end, (ii) an end cover having a radially outwardly extending outer edge portion, (iii) a baseplate having an outer periphery sized to slidably fit into said sidewall at said open end, (iv) a filter element, and (v) a member having a generally longitudinally extending section with an end portion, said longitudinally extending section being sized to slidably fit around said outer periphery of said baseplate and to slidably fit within said sidewall;

b. securing said end cover to said baseplate;

c. securing said member with respect to said filter element so that said longitudinally extending section projects generally away from said filter element;

d. locating said filter element and said member in said canister so that said longitudinally extending section of said member is adjacent and inside of said sidewall and said end portion faces generally toward said open end of said canister;

e. locating said baseplate and said end cover in said canister so that said outer edge portion of said end cover is adjacent said flange and so that said baseplate is located in said open end of said canister between said end cover and said member with said outer periphery being interiorly of said longitudinally extending section;

f. radially inwardly deforming a portion of said sidewall so that said inwardly deformed portion is adjacent the end portion of the longitudinally extending section and said base plate is located between said inwardly deformed portion and the closed end of said canister;

g. interlocking said outer edge portion of said end cover and said flange so that said end cover and said baseplate are secured to said canister; and h. radially inwardly deforming said end portion of said longitudinally extending section so that said deformed end portion engages and is trapped between said baseplate and said inwardly deformed portion of said sidewall thereby securing said member and said filter to said canister.

* * * * *